United States Patent
Morozov

(10) Patent No.: US 6,345,133 B1
(45) Date of Patent: Feb. 5, 2002

(54) FUNCTIONAL DEVICE BASED ON FOCUSING-CONCAVE GRATINGS FOR MULTI-WAVELENGTH CHANNEL MANIPULATION

(75) Inventor: Val N. Morozov, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/470,687

(22) Filed: Dec. 23, 1999

(51) Int. Cl.[7] .................................................. G02B 6/28
(52) U.S. Cl. ............................ 385/24; 385/37; 385/16; 359/124; 359/130; 359/570; 359/572
(58) Field of Search ..................... 385/24, 37; 359/570, 359/572, 124, 130

(56) References Cited

U.S. PATENT DOCUMENTS

| | | | | |
|---|---|---|---|---|
| 4,786,133 A | * | 11/1988 | Gidon | 385/37 |
| 5,450,512 A | * | 9/1995 | Asakura | 385/48 |
| 5,805,759 A | * | 9/1998 | Fukushima | 385/37 |
| 6,256,736 B1 | * | 7/2001 | Nakama | 385/24 |

* cited by examiner

Primary Examiner—Darren Schuberg
Assistant Examiner—Leo Boutsikaris
(74) Attorney, Agent, or Firm—Lacasse & Associates; Randy W. Lacasse; Kevin E. Greene

(57) ABSTRACT

An optical device is described. In one embodiment, the optical device includes first and second concave diffraction gratings, first and second concentrators, first and second sets of fibers, and an array of optical elements. The first concave diffraction grating reflects light from an input beam into multiple light waves of different wavelengths focused at spatially separate locations. The first concentrator has a first set of light guiding channels to transfer the light waves. The first set of fibers is optically coupled to the first set of light guiding channels. The array of optical elements includes optical elements that have at least one input and at least one output. Such inputs of each optical element in the array is coupled to one of the first set of light guiding channels. The second set of fibers is optically coupled to outputs of optical elements in the array. The second concentrator has a second set of light guiding channels. Each of the second set of light guiding channels is optically coupled to a distinct fiber in the second set of fibers. The second concave diffraction grating reflects light from the second concentrator into a single light beam focused at an output fiber.

30 Claims, 10 Drawing Sheets

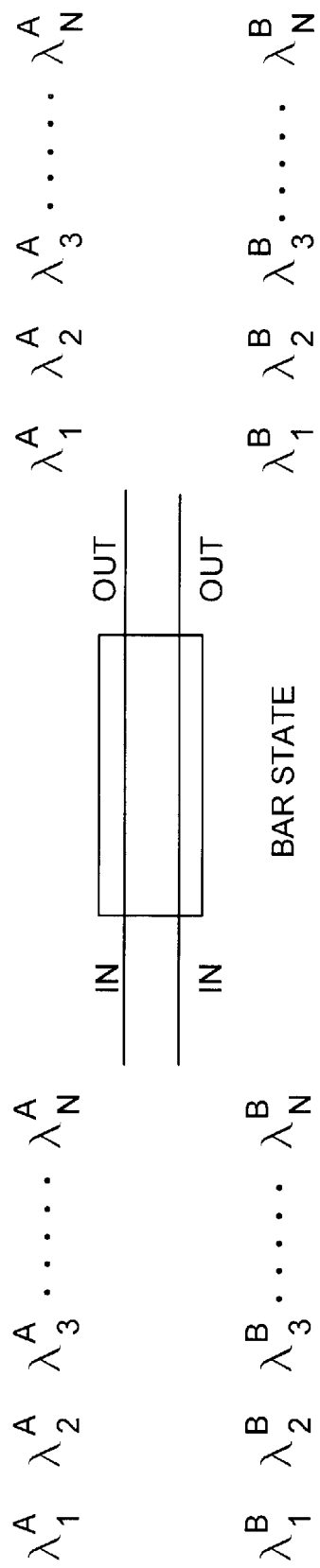
FIG. 3A  BAR STATE
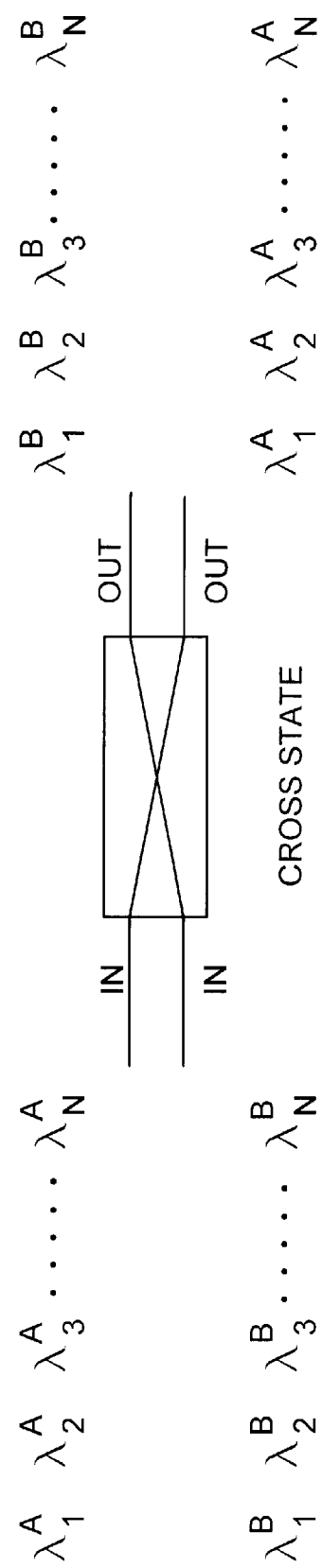
FIG. 3B  CROSS STATE

FUNCTIONAL DEVICE BASED ON FOCUSING-CONCAVE GRATINGS FOR MULTI-WAVELENGTH CHANNEL MANIPULATION

FIELD OF THE INVENTION

The present invention relates to optical devices with diffraction gratings; more particularly, the present invention relates to functional devices for multi-wavelength signal manipulation in fiber-optic networks that are based on focusing and dispersive properties of concave diffraction gratings.

BACKGROUND OF THE INVENTION

Fiber optics has become the core of telecommunication and data networking infrastructures. Optical amplification, routing and switching for wavelength division multiplexing and multi-wavelength channels are the corner stones of current and future fiber networks. Low cost and efficient technology is needed for manufacturing of optical components for WDM fiber optic networks.

U.S. Pat. No. 5,414,540, entitled "Frequency-selective optical switch employing a frequency dispersive element, polarization dispersive element, and polarization modulating element," issued May 9, 1995, describes a frequency-selective optical switch employing a frequency dispersive element, polarization dispersive element, and polarization modulating element. The same scheme is proposed for an add-drop multipexer implementation. The disclosed switch uses diffraction gratings, collimating objectives, birefringence crystals, and a liquid crystal cell array. The design is complicated and very sensitive to alignment tolerances.

A free space version of multi-channel wavelength attenuator was described in J. E. Ford, et al., "32 Channel WDM Graphic Equalizer" in IEEE/LEOS 1996 Summer Topical Mtg Digest, pp. 26–27. FIG. 10 represents an optomechanical design of 32-channel WDM equalizer from the article. In this design, the fiber input is collimated by a doublet lens, diffracted by a blazed grating, focused by a triplet lens on a modulator, and reflected light is focused one more lens into output fiber. Overall efficiency is limited by multiple surface reflections.

Multiplexers and demultiplexors accommodating multi-wavelengths have been based on planar waveguide technology. Such implementations usually include techniques to flatten the passband. There are few reasons why the standard Gaussian shape of passband is not preferred for practical implementation. First, the transmitting laser wavelength can drift away from the passband peak due to temperature variation, for example. Thus, there will be additional loss if the passband is Gaussian. If multiple multiplexers and demultiplexers are cascaded along the transmission line, the overall throughput is reduced when the transmission bands have slightly different center wavelengths due to manufacturing tolerances or temperature variations. Even if the bandwidth centers coincide, the resulting passband width is much narrower due to the Gaussian passband shape. The flat top passband shape is preferred, since it doesn't have such unwanted properties. Methods to flatten the passband shape are already known in planar waveguide technology. For example, an MMI coupler input waveguide or parabolic waveguide horn design have been used in planar multiplexer/demultiplexer. See K. Okamoto, "Planar Lightwave Circuits (PLC)" Photonic Networks-advances in Optical Communication, Springer-Verlag, 1997 pp. 118–132 and K. Okamoto and A. Sugita, "Flat Spectral Response Arrayed-Waveguide Grating Multiplexer with Parabolic Waveguide Horn," Electron. Lett., Vol. 32, pp. 1612–1661.

U.S. Pat. No. 4,387,955 issued Jun. 14, 1983 entitled "Holographic Reflective Grating Multiplexer/Demultiplexer," describes a Multiplexer/Demultiplexer based on a holographically recorded concave grating in which an input signal having multiple wavelengths is separated into multiple signals, each being of a different one of the wavelengths.

SUMMARY OF THE INVENTION

An optical device is described. In one embodiment, the optical device includes first and second concave diffraction gratings, first and second concentrators, first and second sets of fibers, and an array of optical elements. The first concave diffraction grating reflects light from an input beam into multiple light waves of different wavelengths focused at spatially separate locations. The first concentrator has a first set of light guiding channels to transfer the light waves. The first set of fibers is optically coupled to the first set of light guiding channels. The array of optical elements include s optical elements that have at least one input and at least one output. Such inputs of each optical element in the array is coupled to one of the first set of light guiding channels. The second set of fibers is optically coupled to outputs of optical elements in the array. The second concentrator has a second set of light guiding channels. Each of the second set of light guiding channels is optically coupled to a distinct fiber in the second set of fibers. The second concave diffraction grating reflects light from the second concentrator into a single light beam focused at an output fiber.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3A and 3B illustrate a wavelength-nonselective crossbar.

DETAILED DESCRIPTION

An optical device is described. In the following description, numerous details are set forth, such as distances between components, types of molding, etc. It will be apparent, however, to one skilled in the art, that the present invention may be practiced without these specific details. In other instances, well-known structures and devices are shown in block diagram form, rather than in detail, in order to avoid obscuring the present invention.

Overview

Functional devices are described herein that use focusing concave gratings to manipulate multi-wavelength channels. Each of these gratings have an image plane such that when a monochromatic spherical wave illuminates the grating in such a functional device, reflected light is focused in a spot located in the image plane of the grating. Waves with different wavelengths are focused into spatially separate locations at a dispersion plane. The spot shape and positioning of the different spots depend on the grating characteristics (e.g., holographic grating recording and reconstructing conditions). Due to the constraints associated with diffraction efficiency, polarization dependent loss in concave gratings, and wavelength channel separation recommended by ITU, spacing of diffracted spots may be quite small, in a range of 15–50 microns. Larger spacing is possible, but it requires a larger concave grating radius, which means larger overall dimensions and larger aberrations.

Optical networking requires devices that can switch any wavelength in one fiber to another fiber. Wavelength selective cross-connects and add-drop multiplexers can be designed to use the functional device described herein. The quality of messaging in optics networks demands that any given wavelength in a fiber can be attenuated in controllable fashion, thus maintaining integrity of WDM channel.

As the signals propagate through the network, power losses from propagation, splitting, and coupling are periodically replenished by Erbium doped fiber optical amplifiers. In addition, signals can be switched on and off. To avoid cross talk and data loss, it is important to maintain similar signal levels on all channels. Active level compensation at each independent wavelength channel is important device for future WDM networks. This device can serve also as an optical wavelength selective filter in high-speed optical packet switching in ATM switch system to select a cell with a particular wavelength from among multiple WDM cells. Thus, these functional devices are based on focusing and dispersive properties of concave diffraction gratings.

Equalizer (Attenuator) Implementation

Figure 1:
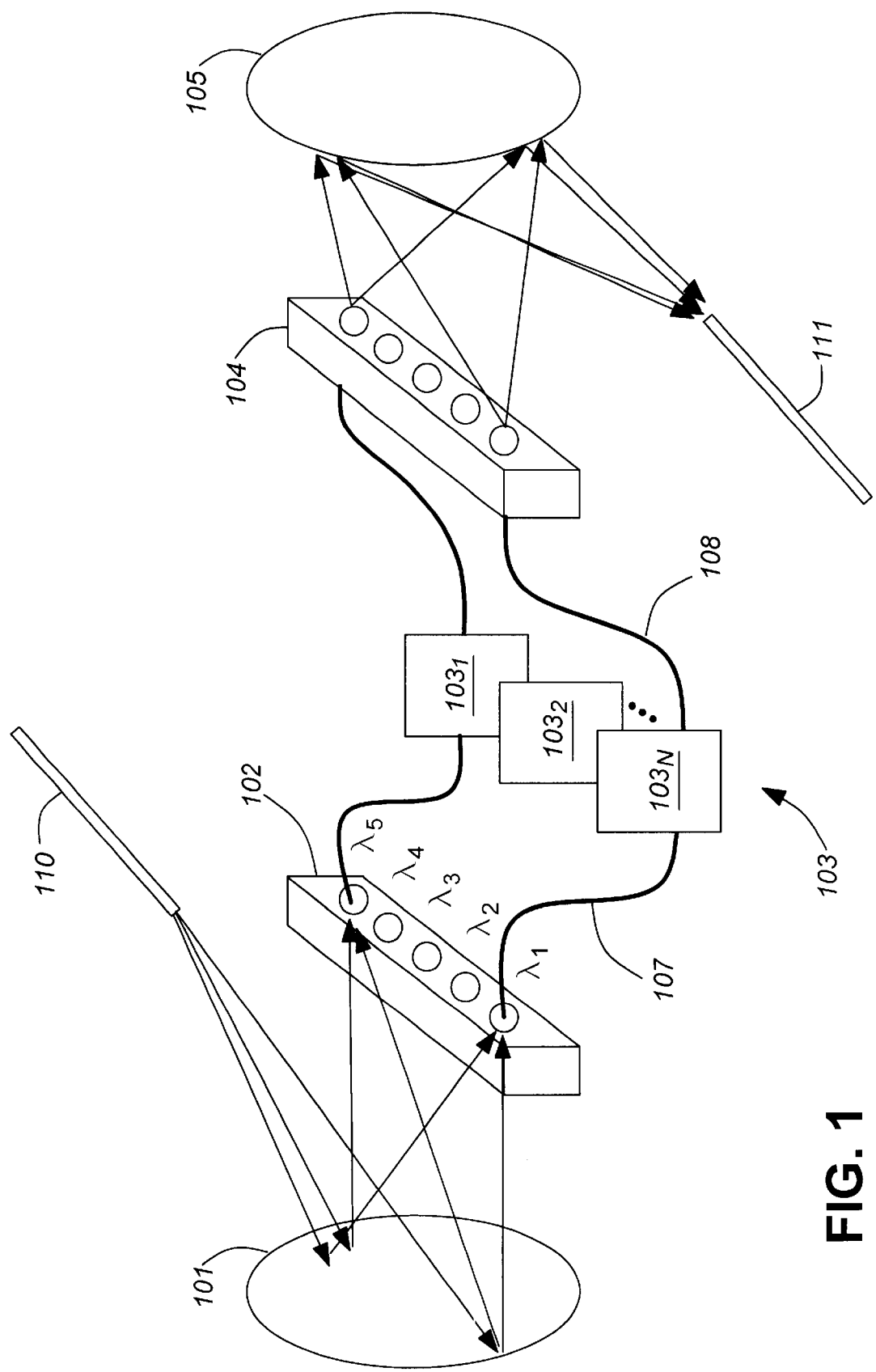
FIG. 1 illustrates one embodiment of a multi-wavelength equalizer device.

FIG. 1 illustrates one embodiment of a multi-wavelength equalizer device. Such an equalizer may operate as a selector or attenuator for a device such as, for example, a WDM. Referring to FIG. 1, the device comprises concave gratings 101 and 105 aligned with concentrators 102 and 104, respectively. In one embodiment, concave gratings 101 and 105 comprise holographic gratings. Ruled concave gratings also can be used. In one embodiment, concave gratings 101 and 105 are optically aligned with concentrators 102 and 104, respectively, with concentrators 102 and 104 positioned at the image plane of gratings 101 and 105, respectively.

Each of concentrators 102 and 104 have multiple light guiding channels. The aperture for the inputs to the light guiding channels of concentrator 102 are located at spots for each of the different wavelengths of light being reflected off and focused by grating 101. The light guiding channels may comprise fibers (fiber ribbons, etc.), planar waveguides, etc.

One end of multiple optical fibers ribbons (or array) 107 are coupled to the outputs of the light guiding channels of concentrator 102. The other ends of fiber array 107 are also coupled to inputs of an attenuator array 103, such that an input of each of attenuators $103_{1-N}$ in attenuator array 103 is coupled to one of the fiber array 107.

The outputs of attenuators $103_{1-N}$ of attenuator array 103 are coupled to one end of fiber array 108. The other end of fiber array 108 are coupled to the inputs of light guiding channels in concentrator 104. The light from outputs of the light guiding channels are directed to grating 105.

In operation, a light from input fiber 110 illuminates concave grating 101. Different wavelengths of the light from input fiber 110 are focused in different spots at the dispersion plane where concentrator 102 is positioned to optically couple diffracted light spots to the light guiding channels of concentrator 102.

Figure 2C:
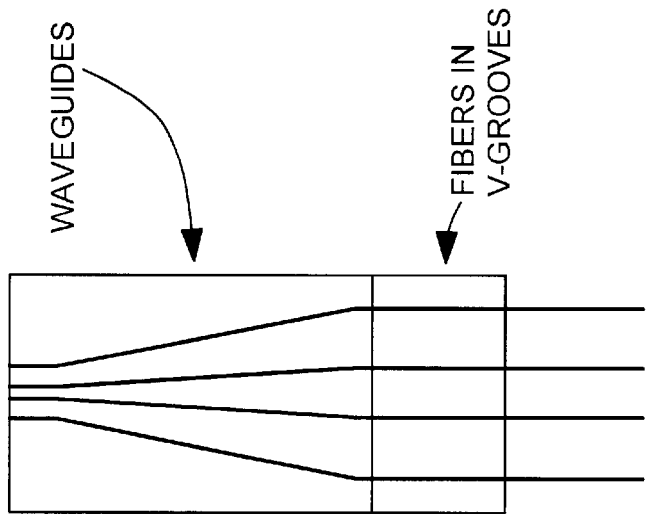
FIG. 2C shows one embodiment of a hybrid version of the concentrator.
Figure 2B:
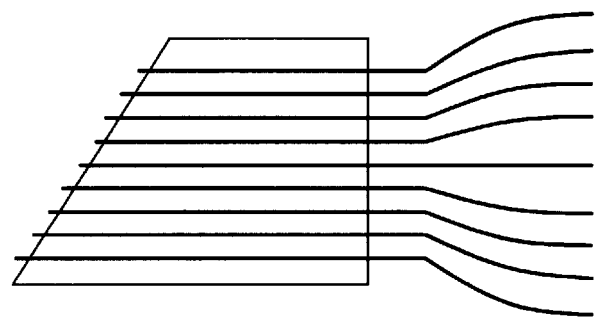
FIG. 2B shows one embodiment of a fiber version of a concentrator.
Figure 2A:
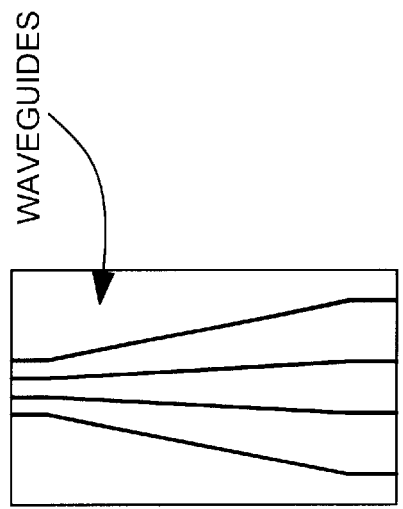
FIG. 2A shows one embodiment of a waveguide version of a concentrator.

A concentrator might be implemented through planar waveguide technology, fiber technology, or a combination of the two. FIGS. 2A–C are schematic illustrations of three concentrators. FIG. 2A shows a waveguide version of a concentrator. FIG. 2B shows a fiber version of a concentrator. FIG. 2C shows one embodiment of a hybrid version of the concentrator with fibers in V-grooves for spacing. The fibers may be in V-grooves to maintain their spacing.

The light guiding channels of concentrator 102 are spaced according to the spot spacing of the incoming light. The output of light guiding channels of the concentrator may have an arbitrary spacing or are equally spaced to a standard value of 250 $\mu$m. In one embodiment, the output of light guiding channels are spaced to permit connection with fibers 107, which deliver light to the inputs of attenuators $103_{1-N}$ in attenuator array 103 (or switches in a switch array). In an alternative embodiment, the output of light guiding channels are spaced to match to inputs of attenuators (or switches) when concentrator 102 is implemented with a waveguide technology.

The outputs of fibers 107 are coupled to attenuator array 103. The attenuators $103_{1-N}$ in attenuator array 103 decrease the intensity of light passing through in a controlled manner. Light beams pass through attenuator array 103 to fibers 108 and then onto the inputs of light guiding channels in concentrator 104. Concentrator 104 delivers light beams to a dispersion plane of second concave grating 105. Multiple beams output from concentrator 104 illuminate concave grating 105 and are focused by concave grating 105 into output fiber 111. Thus, the equalizer of FIG. 1 attenuates multiple wavelengths of light that propagate down in a single output fiber.

WDM Cross-Connect Implementations

Advanced lightwave systems utilizing wavelength-division multiplexed (WDM) channels require two types of optical cross-connects: wavelength non-selective and wavelength selective.

FIGS. 3A and 3B illustrate a wavelength-nonselective crossbar or, in other words, a 2×2 switch. A switch can be in one of the two states: a Bar State as shown by FIG. 3A and a Cross State as shown by FIG. 3B. Referring to FIG. 3A, in the Bar State, the signals on the input channels A and B are not switched to the other channel. Referring to FIG. 3B, in the Cross State, a signal on either input channel A or B is transferred to the opposite output channel. That is, a signal on input channel A is transferred to output channel B and a signal on input channel B is transferred to output channel A. In a wavelength non-selective crossbar, all wavelengths in any input channel are switched or not switched simultaneously. A wavelength selective crossbar allows the switching to occur selectively as to each wavelength in the two input WDM channels.

Figure 4:
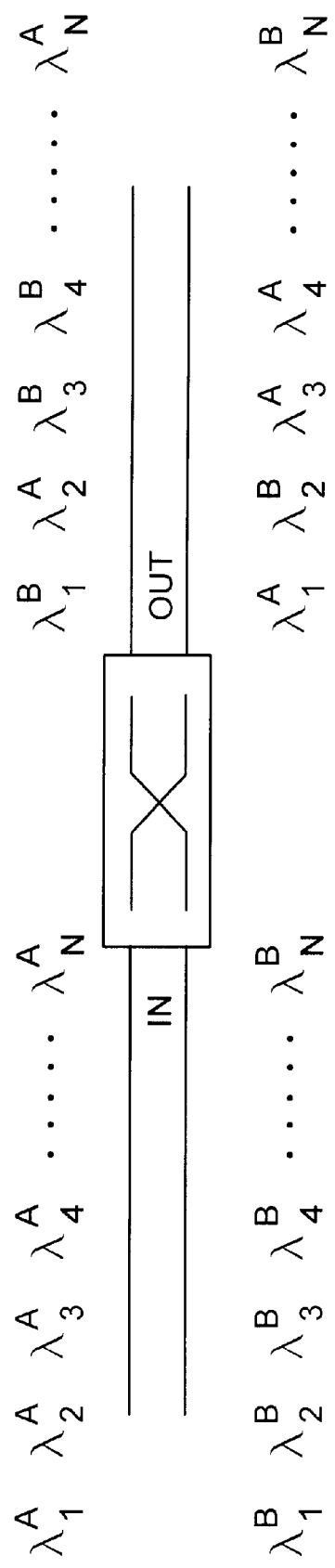
FIG. 4 illustrates wavelength selective cross-connect.

FIG. 4 illustrates a wavelength selective cross-connect. Referring to FIG. 4, the wavelength selective cross-connect demultiplexes incoming wavelengths, determines whether to switch or not to switch each of the incoming wavelengths, and multiplexes then again. In the example given, wavelengths $\lambda_2$ and $\lambda_4$ of input A are not switched.

Figure 5:
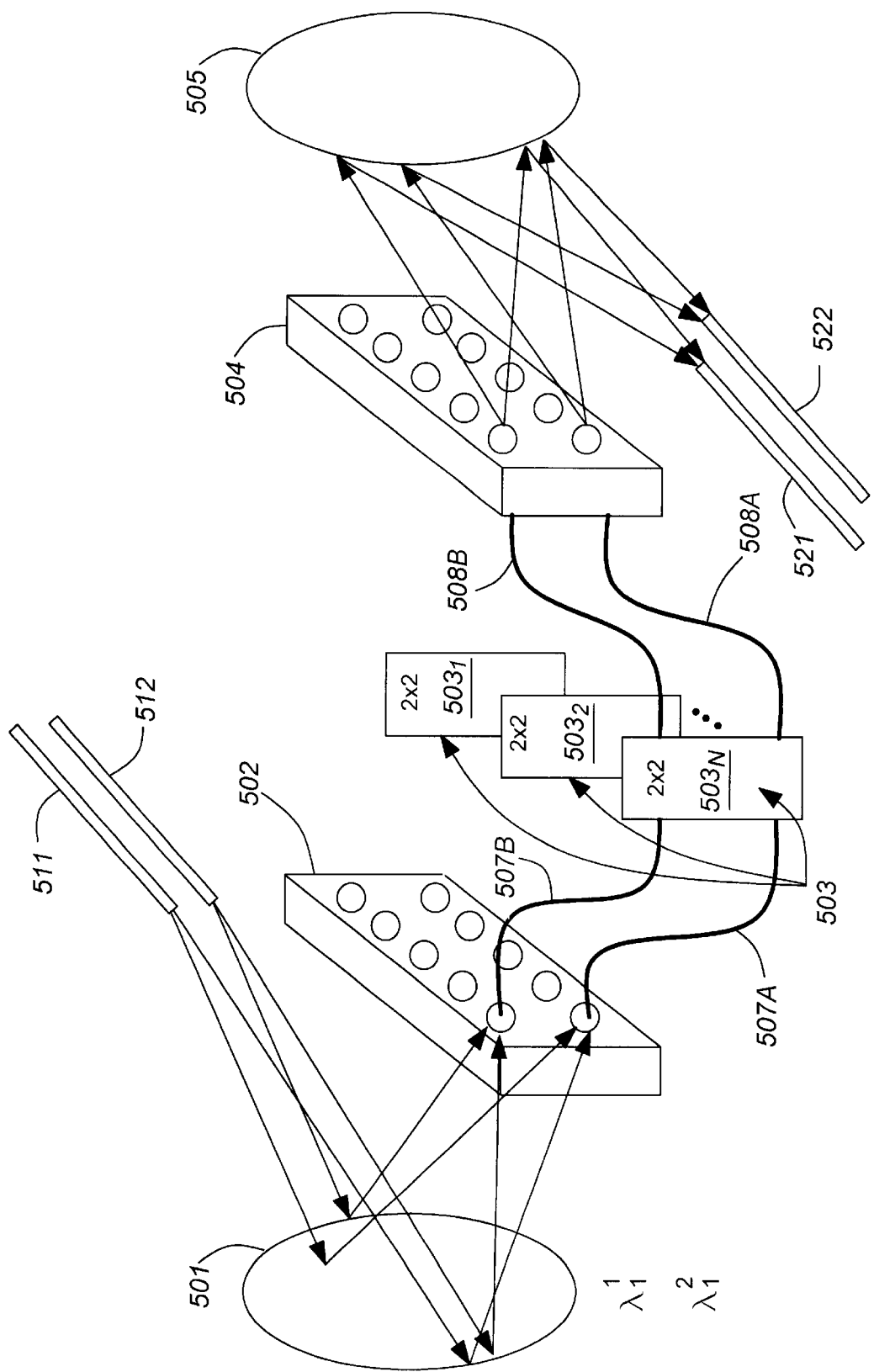
FIG. 5 illustrates one embodiment of a wavelength-selective cross-connect with concave gratings for a WDM.

FIG. 5 is one embodiment of a wavelength-selective cross-connect with concave gratings for a WDM. Referring to FIG. 5, the cross-connect comprises concave gratings 501 and 505 aligned with concentrators 502 and 504, respectively. In one embodiment, concave gratings 501 and 505 comprise holographic gratings. Concave gratings 501 and 505 are positioned with respect to concentrators 502 and 504, respectively. Each of concentrators 502 and 504 has two rows of input apertures in an image plane with each input in the top row being over an input in the bottom row. Each of concentrators 502 and 504 may comprise a pair of concentrators (one above the other), such as the concentrator in FIG. 1, with a row of light guiding channels. One end of each fiber in a set of fibers 507A–B id coupled to an output of the light guiding channels of concentrators 502. The other ends of fibers 507A–B are also coupled to a switch array 503.

Switch array 503 comprises multiple 2×2 switches. The inputs of the switches are coupled to the other ends of fibers 507A–B such that the inputs of each of switches $503_{1-N}$ in switch array 503 is optically coupled to a light guiding channel of each of light guiding channels of concentrator 502.

The outputs of each of switches $503_{1-N}$ in switch array 503 are coupled to fibers 508A–B, which, in turn, are coupled to inputs of a light guiding channels of concentrator 504. Note that the light guiding channels of concentrator 502 and 504 may comprise fibers (fiber ribbons, etc.), planar waveguides, etc.

In operation, two input fibers 511 and 512 illuminate first concave diffraction grating 501. Each of input fibers 511 and 512 contains many wavelengths. Input fiber 511 is located above the dispersion plane of concave grating 501 and input fiber 512 is below this plane. Concave grating 501 has imaging properties and forms an image of the object. Images of input fibers 511 and 512 corresponding to different wavelengths are located in the vicinity of the dispersion plane. Images of input fiber 511 are located below the dispersion plane, while images of input fiber 512 are located above the dispersion plane. In one embodiment, stationary anastigmatic mounts of concave grating 501 provide diffraction limited imaging of a multi-wavelength point source within the gain bandwidth of an erbium-doped fiber amplifier. In a normal imaging case, light spots corresponding input fiber 511 are spatially separated for each of the different wavelengths and are located along a line below the dispersion plane, and light spots from input fiber 512 are spatially separated for each of the different wavelengths and are located along a line above the dispersion plane. These spots illuminate concentrator 502 with its two rows of light guiding channels.

Figure 6:
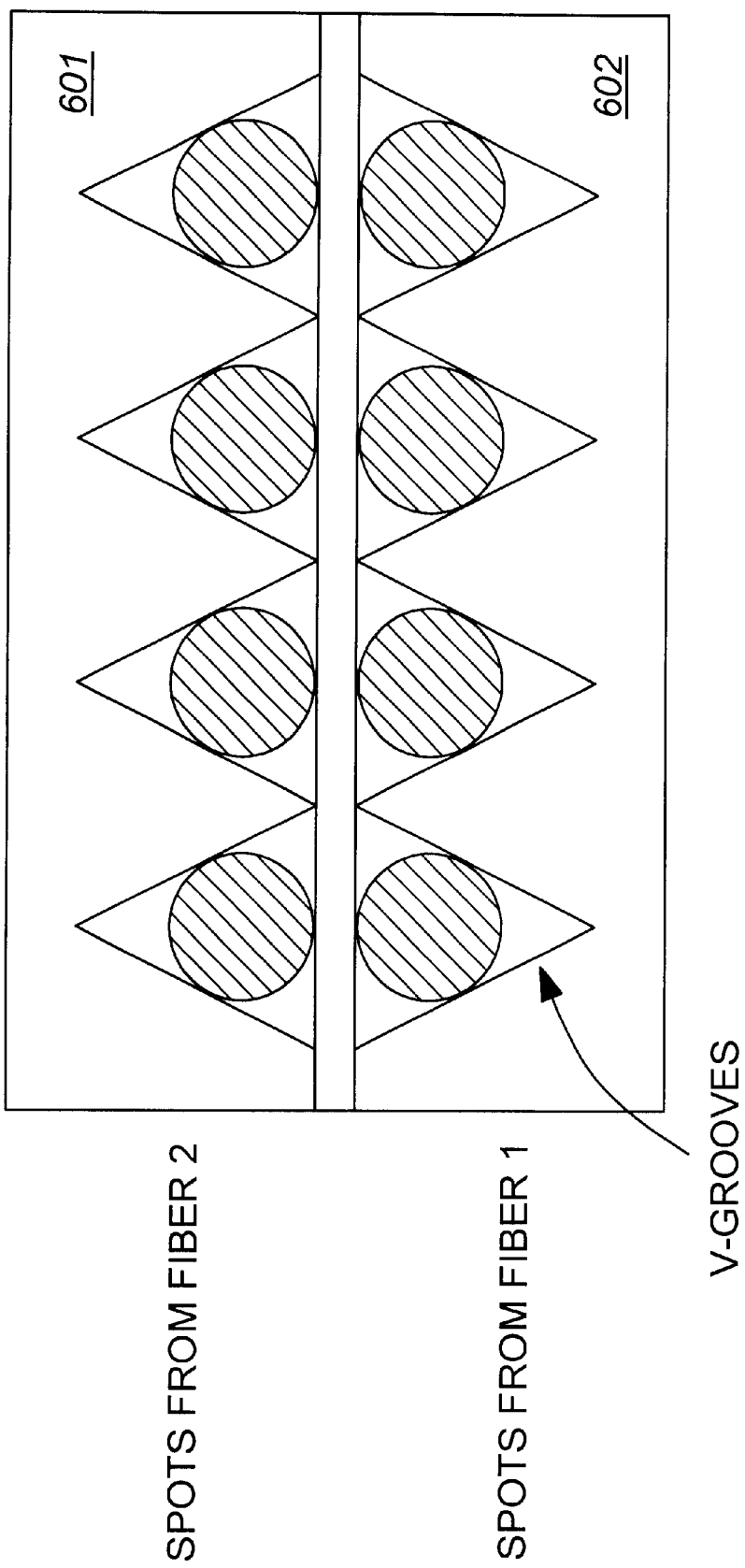
FIG. 6 illustrates a cross-section of a fiber based concentrator.

In one embodiment, concentrator 502 is fiber based, such as shown, for example, in FIG. 6. Referring to FIG. 6, concentrator 600 comprises a pair of single row concentrators 601 and 602 attached closely each other. The spots from the grating are focused into V-grooves. Waveguide and hybrid implementations are possible as well and the selected approach may be dictated solely by the designer.

The two fibers from the same column, one corresponding to the spot from input fiber 511 and another corresponding to the spot from input fiber 512, are coupled to one of switches $503_{1-N}$. Switched signals are coupled by fibers 508 and displayed at the dispersion plane of concave grating 505. In the dispersion plane of concave grating 505, light spots are arranged in two rows using concentrator 504 using fibers 508 coupled to outputs of each of switches $503_{1-N}$. From concentrator 504, light beams are directed toward grating 505. If gratings 501 and 505 are identical, and the spacing of the light spots is identical also, after diffraction on concave grating 505, light spots from the upper row of concentrator 504, via the light guiding channels of concentrator 504, are focused by grating 505 into output fiber 522, and light spots from the lower row of concentrator 504, via the light guiding channels, are focused into output fiber 521. Thus, cross connect 500 provides arbitrary wavelength permutation between two input fibers and two output fibers.

Figure 7:
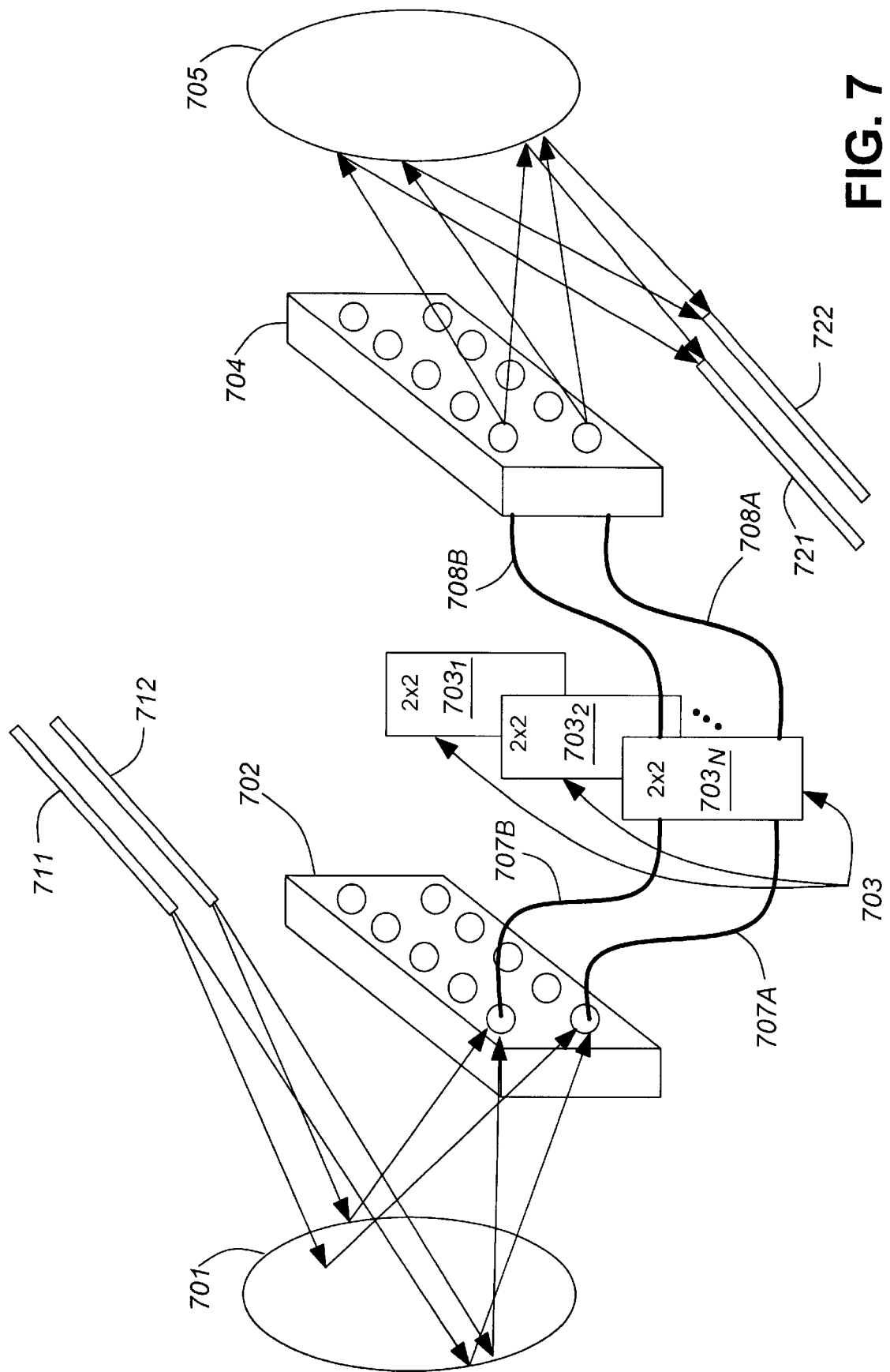
FIG. 7 illustrates one embodiment of an Add-Drop Multiplexer for a WDM.

FIG. 7 illustrates one embodiment of an Add-Drop Multiplexer for use in, for example, a WDM. Optical wavelength Add-Drop Multiplexers (ADM) selectively remove one or more WDM channels and replaces them with new channels at the same wavelengths. Residual leakage of the dropped channels should be very small and low-channel cross talk wavelength multiplexers and demultiplexers are required.

Referring to FIG. 7, the schematic of the ADM is based on concave gratings and two rows concentrators. The ADM has the same structure as shown in FIG. 5. Referring to FIG. 7, input fiber 711 carrying WDM channels illuminates a concave grating 701. The wavelengths to be added are propagating in another fiber 712 displaced with respect to input fiber 711 in the object plane similar to that of FIG. 5. Light from both fibers 711 and 712 illuminate grating 701, which focuses and disperses light in a focal plane, where it is coupled to the inputs of the light guiding channels of concentrator 711. Concentrator 702 is coupled to coupled to switch array 703 of 2×2 switches, via fibers 707. The outputs of switches are coupled to one end of fibers 708. The other end of fibers 708 are coupled to the inputs of light guiding channels in concentrator 704 and then onto grating 705. Thus, wavelengths from input channel and wavelengths to be dropped are input to switches in switch array 703, where switches redirects wavelengths to be dropped into the drop wavelength fiber 721 and wavelengths to be added into fiber 222.

Figure 8:
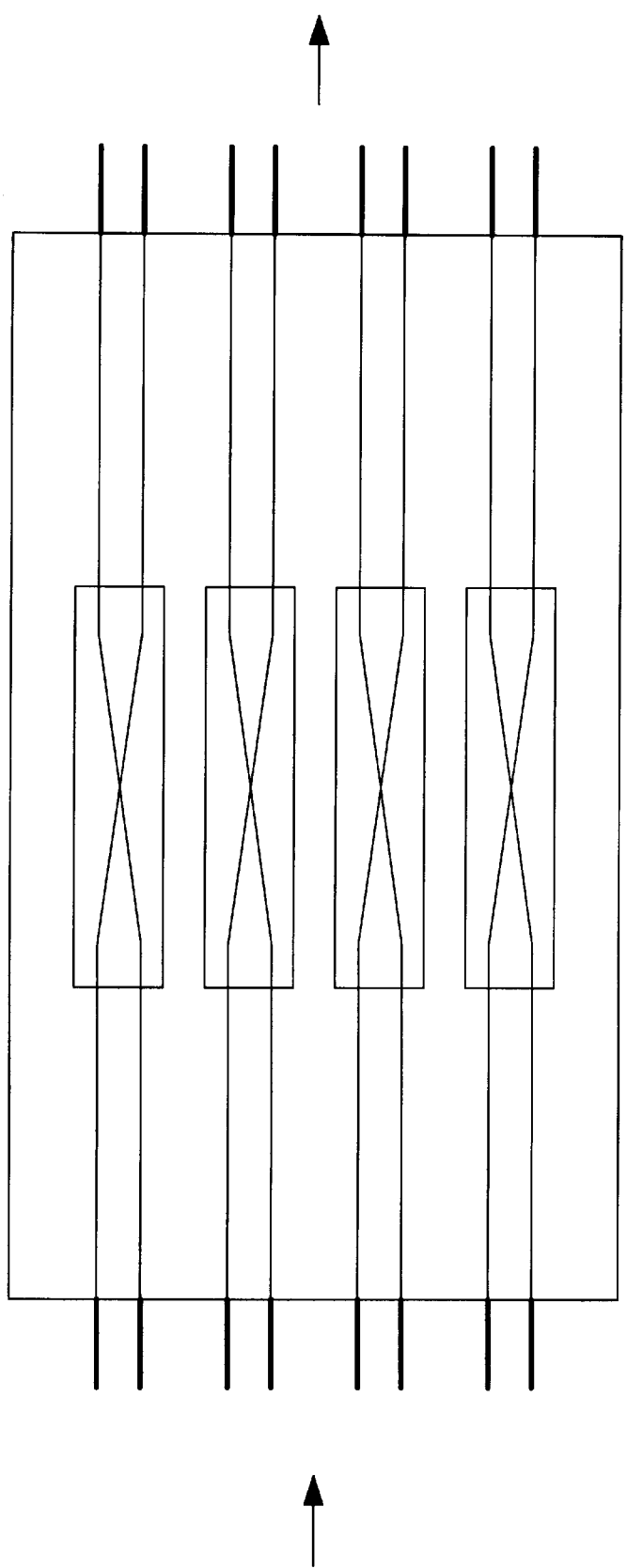
FIG. 8 illustrates one embodiment of a planar optical circuit with a one-dimensional (1-D) array of waveguide switch array.

FIG. 8 illustrates one embodiment of a planar optical circuit with a one-dimensional (1-D) array of waveguide switch array. Referring to FIG. 8, an array of waveguide switches $801_{1-N}$ are shown. In one embodiment, switches $801_{1-N}$ are 2×2 switches and/or attenuators that are integrated in a plane. In other words, this embodiment represents a waveguide version of the 2×2 switches. It is important that in certain embodiments all discussed above devices comply to the requirement of a substantially flat pass band.

One embodiment of pass-band flattening in multiplexers and demultiplexers is described below and is based on a combination of optics for light focusing and dispersion, such as a concave holographic grating, and a waveguide concentrator comprising an input waveguide for delivering multi-wavelength signals and output waveguides, where demultiplexed wavelengths propagate. To achieve passband flattening in free-space multiplexers and demultiplexers, the distribution of the optical field across the cross-section of input/output waveguides in the concentrator are modified. Without modification, the optical field can be approximated as Gaussian. If a Gaussian field passes through a dispersive element and is imaged into an output waveguide, then the passband has a Gaussian shape again. If a field after single mode input waveguide propagates, for example, in a Y-junction or multi-mode interference filter, the shape of optical field is gradually transformed from a fundamental Gaussian mode to a mixture of higher order modes. Single peak intensity distribution becomes two peaks distribution initially. As the wave propagates further, the intensity of higher order modes is larger and optical field intensity distribution becomes more complicated, in which many intensity peaks can be observed. After propagation of light for a certain length in Y-branch or NMI, the optical field intensity distribution at the end face of input waveguide can be selected specific, double peak form, such that when being focused and dispersed by optical system into the faces of output waveguides, resulting pass band flattening is achieved. The amount of flattening that may be achieved may enable reaching a passband width by 0.5 db level at approximately 30 GHz, while only reaching approximately 10 GHz without flattening.

Figure 9:
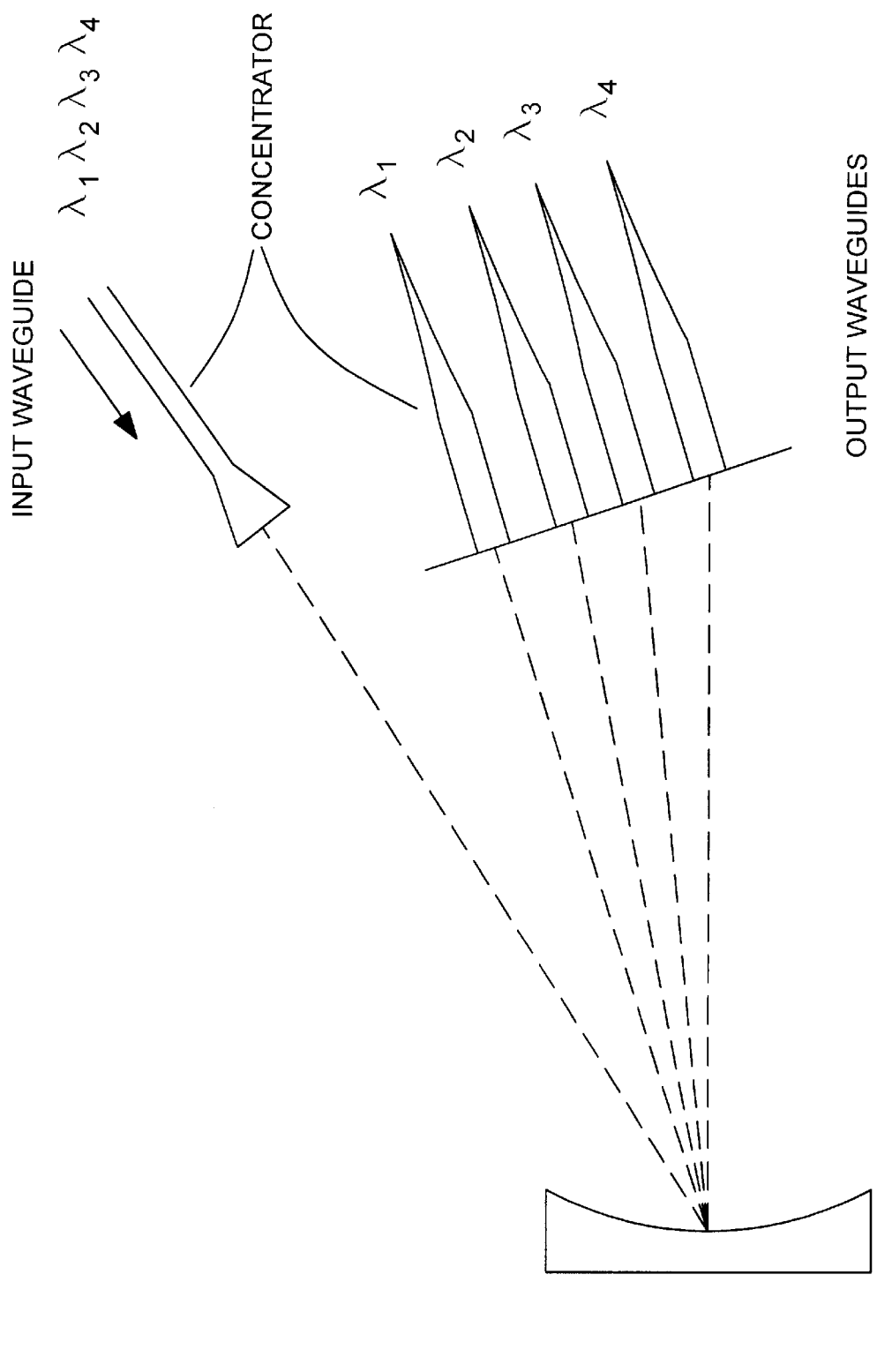
FIG. 9 illustrates an example of multiplexer/demultiplexer using bulk optics that is based on concave grating and planar concentrator with a passband flattening capability.
Figure 10:
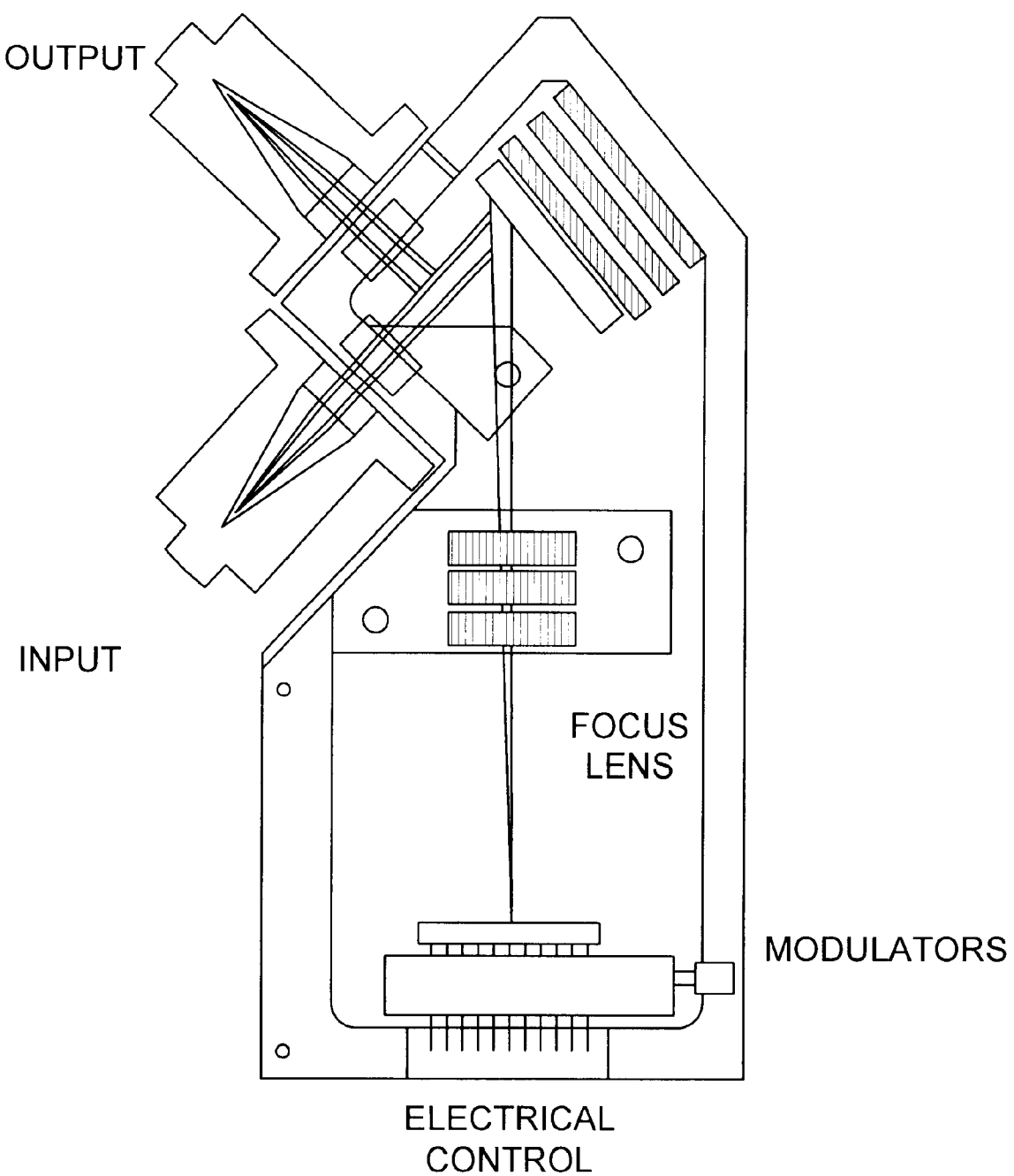
FIG. 10 in the article represents an optomechanical design of 32-channel WDM equalizer.

FIG. 9 illustrates an example of a bulk optics multiplexer/demultiplexer based on concave grating and planar concentrator with a passband flattening capability. Referring to FIG. 9, the output of the input waveguide and inputs of output waveguides are widened in comparison to the single mode waveguides width employed for delivery of optical signals. The degree of widening of the output face of the input waveguide and input faces of output waveguides depend on the separation between output waveguides and dispersion of the grating. In one embodiment, for example, separation between the output waveguides is 40 microns, and the corresponding dispersion is 2.5 GHz/micron. To flatten passband in that case, output face of input waveguide was widened to 40 microns through MMI, and input faces of input waveguides were widened to 20 microns through parabolic horns, while typical single mode width is about 9 microns. The input waveguide and output waveguides may be placed on the same wafer or separate wafers. In one embodiment, the grating is concave such that focusing and dispersion is achieved by one optical element, or functions of focusing and dispersion can be separated, i.e. be performed by plane grating and optical lens or concave mirror.

Thus, an optical apparatus for wavelength multiplexing/demultiplexing in fiber optics communication networks is described. The apparatus comprises bulk optical elements for focusing and dispersing light and a planar waveguide concentrator in which output optical field in an input waveguide and aperture of output waveguides are modified using optical waveguide technology, such that imaging of the optical field of an input waveguide into an aperture of the output waveguides results in a flattened pass band for the entire device.

Therefore, embodiments above contain significantly low number of parts and allows for reduced insertion loss due to lesser number of reflective surfaces. At the same time, embodiments represent simpler designs that are easier to align and to maintain alignments over a temperature range. Also high isolation may be between channels, and the devices posses lower cross-talk level compare to waveguide implementation. Polarization dependent loss will also be reduced, because concave holographic gratings posses by high diffraction efficiency—80 % and difference between efficiencies for TE and TM polarization can be -done extremely small—1–2%.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. An optical device comprising:
   a first concave diffraction grating to reflect light from an input beam into a plurality of light waves of different wavelengths focused at spatially separate locations;
   a first concentrator having a first plurality of light guiding channels to transfer the plurality of light waves;
   a first plurality of fibers optically coupled to the first plurality of light guiding channels;
   an array of optical elements, wherein each of the array of optical elements has at least one input and at least one output, the at least one input of each optical element in the array being coupled to one of the first plurality of light guiding channels;
   a second plurality of fibers optically coupled to the at least one output of optical elements in the array;
   a second concentrator having a second plurality of light guiding channels, each of the second plurality of light guiding channels optically coupled to a distinct fiber in the second plurality of fibers; and
   a second concave diffraction grating to reflect light from the second concentrator into a single light beam focused at an output fiber.

2. The optical device defined in claim 1 wherein at least one of the first or second concave gratings comprises a concave holographic grating.

3. The optical device defined in claim 1 wherein field distribution in an input end of an input planar waveguide of the first and second concentrators and field distributions in the input end of output waveguides of the first and second concentrators are modified to result in altering the shape of the spectral pass band.

4. The optical device defined in claim 3 wherein the altered shape is a more flattened shape.

5. The optical device defined in claim 2 wherein spot location and shaping of the first plurality of light guiding channels is at an imaging plane.

6. The optical device defined in claim 5 wherein field distribution in an input end of an input planar waveguide of the first and second concentrators and field distributions in the input end of output waveguides of the first and second concentrators are modified to result in altering the shape of the spectral pass band.

7. The optical device defined in claim 6 wherein the altered shape is a more flattened shape.

8. The optical device defined in claim 1 wherein the plurality of light waves are focused at different locations at a dispersion plane of the first grating.

9. The optical device defined in claim 8 wherein field distribution in an input end of an input planar waveguide of the first and second concentrators and field distributions in the input end of output waveguides of the first and second concentrators are modified to result in altering the shape of the spectral pass band.

10. The optical device defined in claim 9 wherein the altered shape is a more flattened shape.

11. The optical device defined in claim 8 wherein the first concentrator is located at the dispersion plane.

12. The optical device defined in claim 1 wherein at least one of the first or second concentrator comprises a waveguide concentrator.

13. The optical device defined in claim 1 wherein at least one of the first or second concentrator comprises a fiber concentrator.

14. The optical device defined in claim 1 wherein at least one of the first or second concentrator comprises a hybrid concentrator with individual fibers optically coupled to a individual waveguides.

15. The optical device defined in claim 14 wherein the hybrid concentrator comprises a plurality of V-grooves to hold the individual fibers.

16. The optical device defined in claim 1 wherein the array of optical elements comprises an array of attenuators.

17. The optical device defined in claim 1 wherein the array of optical elements comprises an array of switches.

18. The optical device defined in claim 1 wherein field distribution in an input end of an input planar waveguide of the first and second concentrators and field distributions in the input end of output waveguides of the first and second concentrators are modified to result in altering the shape of the spectral pass band.

19. The optical device defined in claim 18 wherein the altered shape is a flattened shape.

20. An optical device comprising:
- a first concave diffraction grating to reflect light from a pair of input beams from a pair of input fibers into a plurality of light waves of different wavelengths focused at spatially separate locations;
- a first pair of concentrator rows of light guiding channels to transfer the plurality of light waves;
- a first plurality of fibers optically coupled to the rows of light guiding channels;
- an array of 2×2 switches, wherein a distinct pair of the first plurality of fibers are coupled to inputs of a distinct one of the 2×2 switches in the array;
- a second plurality of fibers optically coupled to outputs of the 2×2 switches in the array;
- a second pair of concentrator rows of light guiding channels having a second plurality of light guiding channels, each of the second plurality of light guiding channels optically coupled to a distinct fiber in the second plurality of fibers; and
- a second concave diffraction grating to reflect light from the second concentrator into a single light beam focused at a pair of output fibers.

21. The optical device defined in claim 20 wherein at least one of the first or second concave gratings comprises a concave holographic grating.

22. The optical device defined in claim 20 wherein field distribution in an input end of an input planar waveguide of the first and second pair of concentrator rows and field distributions in the input end of output waveguides of the first and second pair of concentrator rows are modified to result in altering the shape of the spectral pass band.

23. The optical device defined in claim 22 wherein the altered shape is a substantially flattened shape.

24. The optical device defined in claim 21 wherein spot location and shaping of the first plurality of light guiding channels is at an imaging plane.

25. The optical device defined in claim 20 wherein the plurality of light waves are focused at different locations at a dispersion plane of the first grating.

26. The optical device defined in claim 25 wherein the first pair of concentrator vows is located at the dispersion plane.

27. The optical device defined in claim 20 wherein at least one of the first or second pair of concentrator vows comprises a waveguide concentrator.

28. The optical device defined in claim 20 wherein at least one of the first or second pair of concentrator vows comprises a fiber concentrator.

29. The optical device defined in claim 20 wherein at least one of the first or second pair of concentrator vows comprises a hybrid concentrator with individual fibers optically coupled to a individual waveguides.

30. The optical device defined in claim 29 wherein the hybrid concentrator comprises a plurality of V-grooves to hold the individual fibers.

* * * * *